(12) United States Patent
De Laet et al.

(10) Patent No.: US 12,631,246 B2
(45) Date of Patent: May 19, 2026

(54) INFLATABLE MOUNTING SEAL

(71) Applicants: ZF FRIEDRICHSHAFEN AG,
Friedrichshafen (DE); **ZF WIND
POWER ANTWERPEN N.V.**,
Lommel (BE)

(72) Inventors: Wim De Laet, Antwerp (BE); **Witikind
Van Ouytsel**, Friedrichshafen (DE);
Andries Boonen, Friedrichshafen (DE)

(73) Assignees: ZF FRIEDRICHSHAFEN AG,
Friedrichshafen (DE); **ZF WIND
POWER ANTWERPEN N.V.**,
Lommel (BE)

( * ) Notice: Subject to any disclaimer, the term of this
patent is extended or adjusted under 35
U.S.C. 154(b) by 0 days.

(21) Appl. No.: 18/848,543

(22) PCT Filed: Feb. 20, 2023

(86) PCT No.: PCT/EP2023/054126

§ 371 (c)(1),
(2) Date: Sep. 19, 2024

(87) PCT Pub. No.: WO2023/179987

PCT Pub. Date: Sep. 28, 2023

(65) Prior Publication Data

US 2025/0198498 A1 Jun. 19, 2025

(30) Foreign Application Priority Data

Mar. 24, 2022 (DE) ..................... 10 2022 202 874.0

(51) Int. Cl.
*F16H 57/029* (2012.01)
*F16H 57/031* (2012.01)
*F16H 57/02* (2012.01)

(52) U.S. Cl.
CPC ......... *F16H 57/029* (2013.01); *F16H 57/031*
(2013.01); *F16H 2057/02078* (2013.01)

(58) Field of Classification Search
CPC ................. F16H 57/029; F16H 57/031; F16H
2057/02078; F16H 2057/0062; F16H
2057/0093; F16H 15/46; B60J 10/244
See application file for complete search history.

(56) References Cited

U.S. PATENT DOCUMENTS

| | | | | |
|---|---|---|---|---|
| 2,456,614 | A | 12/1948 | Banker | |
| 2,752,175 | A * | 6/1956 | Fletcher ................... | F16J 15/46 |
| | | | | 415/113 |
| 3,642,291 | A * | 2/1972 | Zeffer ...................... | F16J 15/46 |
| | | | | 277/583 |
| 9,714,701 | B2 | 7/2017 | Mitsch | |
| 2012/0125150 | A1 | 5/2012 | Dinter | |

FOREIGN PATENT DOCUMENTS

| | | |
|---|---|---|
| JP | 2013060969 A | 4/2013 |
| KR | 101842376 B1 | 3/2018 |

* cited by examiner

*Primary Examiner* — Thomas C Diaz
(74) *Attorney, Agent, or Firm* — LEYDIG, VOIT &
MAYER, LTD.

(57) ABSTRACT

An arrangement including a gearbox and a seal. The gearbox
has a housing and at least one means arranged at least
partially in the interior of the housing. The seal is filled with
an over-pressurized fluid. The seal is braced by the over-
pressure in a gap running between the means and the
housing.

12 Claims, 1 Drawing Sheet

INFLATABLE MOUNTING SEAL

CROSS REFERENCE TO RELATED APPLICATIONS

This application is a U.S. National Phase application under 35 U.S.C. § 371 of International Application No. PCT/EP2023/054126, filed on Feb. 20, 2023, and claims benefit to German Patent Application No. DE 10 2022 202 874.0, filed on Mar. 24, 2022. The International Application was published in German on Sep. 28, 2023 as WO 2023/ 179987 A1 under PCT Article 21(2).

FIELD

The invention relates to an arrangement including a gearbox and a seal, a method of mounting or dismounting the arrangement, and a seal configured for the arrangement.

BACKGROUND

Wind turbine gearboxes often must be partially dismantled for mounting and dismounting. This involves opening the gearbox housing and closing the resulting opening with a transport covering. The housing is open before the transport covering is fitted. There is the risk of dirt particles entering the interior of the gearbox while the housing is open.

SUMMARY

In an embodiment, the present disclosure provides an arrangement comprising a gearbox and a seal. The gearbox has a housing and at least one means arranged at least partially in the interior of the housing. The seal is filled with an over-pressurized fluid. The seal is braced by the over-pressure in a gap running between the means and the housing.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
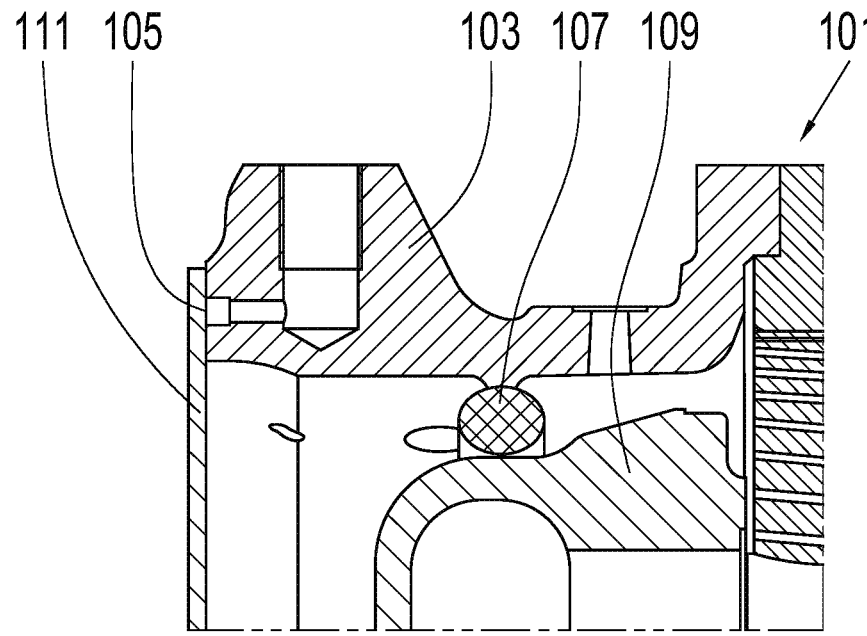
FIG. 1A illustrates a cross-section of a gearbox.

In an embodiment, the present invention prevents the ingression of impurities into an open gearbox housing. This is achieved by arrangements, methods, and seals according to the present disclosure.

The arrangement comprises a gearbox, such as a wind turbine gearbox, and a seal. The gearbox has a housing and at least one means arranged in the interior of the housing. The interior of the housing is characterized by a cavity that is at least partially encapsulated by the housing. At least part of the means is located in this cavity.

The seal is located in a gap running between the means and the housing and is filled with an over-pressurized fluid. Fluid refers to a liquid or a gas. In particular, the seal can be filled with air.

An overpressure is a pressure that lies above the ambient pressure. In this case, it is a pressure that exceeds the pressure present inside the housing.

The seal consists of a material that yields to the overpressure. Preferably, the seal is made of an elastomer.

If the seal is subjected to overpressure, this causes the material to deform elastically and the seal to expand due to the resiliency of the material. As a result, the seal becomes braced in the gap between the means and the housing. The means and the housing are subjected to overpressure along the gap due to the seal. A corresponding force leads to the bracing of the means.

Due to the bracing, the seal is force-fitted in the gap and seals the gap. This prevents the ingression of impurities. The seal is characterized in that it adapts its shape to the gap running between the means and the housing. This makes it universally applicable. No special adjustments of the gearbox are required.

In a preferred further embodiment, the seal completely fills the gap. This improves the sealing effect.

In a preferred further embodiment, the means is rotatably mounted in the housing. Thus for example, the means is a shaft or a planet carrier. The seal, in turn, is rotationally symmetrical to an axis of rotation of the means.

In particular, the seal can have the shape of a toroid according to a preferred further embodiment. A toroid refers to a ring with a constant cross-section. The cross-section is preferably circular or rectangular.

The housing is preferably configured with at least one opening. In a mounted condition of the gearbox, this opening can be closed with a covering. The housing can also consist of two or more parts, which together close the opening. If the housing parts are separated from each other, the opening is exposed accordingly. In a further embodiment, the seal is insertable through the opening into the interior of the housing and placeable in the gap.

In a further preferred embodiment, a transport covering is provided for closing the opening. The opening is therefore closed or closable with the transport covering. A transport covering is a covering that is mounted on the housing for the purpose of transporting the gearbox in such a way that it closes the opening. The transport covering is used to close the opening in an air-tight and/or oil-tight manner, while the seal is only intended as a temporary closure that protects the gearbox from contamination until the transport covering is mounted.

A method according to an embodiment of the present disclosure is used for mounting and/or dismounting of the further embodiment described above with a housing that has an opening. The carrying out of the method requires that the seal is initially, i.e. before the subsequent method steps are carried out, without overpressure and is located outside the housing. The seal may already contain a fluid, such as air. However, its pressure initially corresponds to the ambient pressure.

If the opening is closed, for example with the transport covering, it must then be exposed, for example by removing the transport covering. According to the present disclosure, the seal is inserted through the opening at least partially, preferably completely, into the interior of the housing. Afterwards, the seal is placed between the means and the housing i.e. in the gap. In this position, the seal is filled with the fluid. The fluid is pressurized with the overpressure so that the seal is braced between the means and the housing.

In a preferred further embodiment, the opening is then closed by the transport covering.

According to a further method according to the present disclosure, the steps of the method according to the present disclosure described above are carried out in reverse order in order to remove the seal. Accordingly, the seal is first filled with the over-pressurized fluid and braced by the overpressure in the gap between the means and the housing. At least part of the fluid is now drained from the seal so that any further part of the fluid remaining in the seal has ambient pressure. This releases the bracing of the seal between the means and the housing, and the seal can be removed through the opening in a subsequent step.

If the opening is closed with the transport covering before the method steps described above are carried out, the transport covering is removed, according to a preferred further embodiment, before the at least one part of the fluid is drained.

The above-described seal of the arrangement according to the present disclosure or of a preferred further embodiment is itself in accordance with the present disclosure.

A preferred exemplary embodiment of the present disclosure is shown in the figures. Corresponding reference numerals indicate thereby identical or functionally identical features.

Figure 1B:
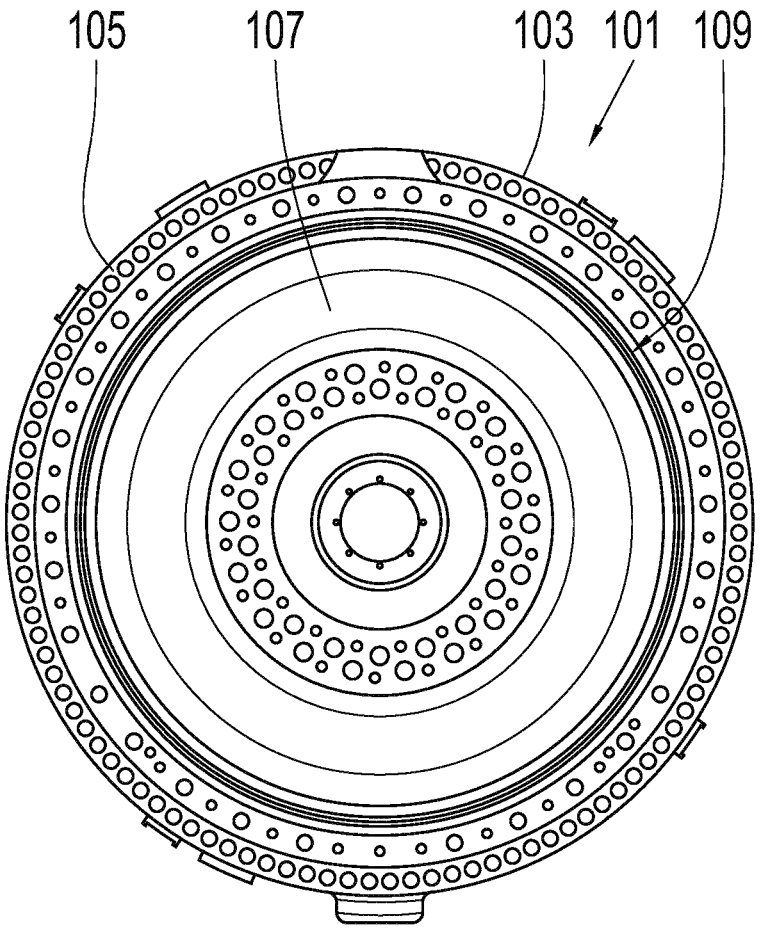
FIG. 1B illustrates an axial view of the gearbox.

The gearbox 101 shown in FIGS. 1A and 1B has a housing 103. This forms a flange 105.

Along the flange 105, a part of the housing 103 shown in FIGS. 1A and 1B can be connected to another part. The other part is removed for mounting and dismounting purposes. Then the gearbox is open, as shown in FIGS. 1A and 1B.

To prevent dirt from penetrating into the interior of the housing 103 during this time a seal 107 is provided. This is disposed between the housing 103 and a rotatably mounted planet carrier 109 and is rotationally symmetrical to an axis of rotation of the planet carrier 109.

The seal 107 is configured as an elastic ring. It can be filled with compressed air. As a result of the filling with compressed air, the seal 107 expands and is pressed against the housing 103 and the planet carrier 109. Thereby, the seal 107 forms a barrier that prevents the ingression of dirt.

A transport covering 111 shown in FIG. 1A seals the housing 103 in an oil-tight manner. The transport covering 111 is screwed to the flange 105. There is preferably a seal between the transport covering 111 and the flange, which prevents oil from escaping.

The seal 107 serves to protect the gearbox from ingressing dirt until the transport covering 111 is mounted. It can be removed for putting the gearbox into operation after the pressurized air has been released.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

101 gearbox
103 housing
105 flange
107 seal
109 planet carrier
111 transport covering

The invention claimed is:

1. An arrangement comprising:
   a gearbox; and
   a seal, wherein:
   the gearbox has a housing and at least one planet carrier arranged at least partially in an interior of the housing,
   the seal is filled with an over-pressurized fluid, and
   the seal is arranged in a gap running between a planet gear portion of the planet carrier and the housing, the seal being braced in the gap by an overpressure caused by the over-pressurized fluid.

2. The arrangement according to claim 1, wherein the seal completely fills the gap.

3. The arrangement according to claim 1, wherein the planet carrier is rotatably mounted in the housing, and wherein the seal is rotationally symmetrical to an axis of rotation of the planet carrier.

4. The arrangement according to claim 1, wherein the seal has a shape of a toroid.

5. The arrangement according to claim 1, wherein the housing has an opening through which the seal is insertable into the interior of the housing and placeable in the gap.

6. The arrangement according to claim 5, comprising a transport covering for closing the opening.

7. The arrangement according to claim 6, wherein the seal is arranged axially between the transport covering and a planet gear on the planet carrier.

8. The arrangement according to claim 1, wherein the housing includes a protrusion that extends radially inward toward an axis of rotation of the planet carrier, and wherein the seal is arranged between the protrusion and the plant carrier.

9. A method of mounting or dismounting the arrangement according to claim 1, wherein the seal is initially without overpressure and is located outside the housing, the method comprising:
   inserting the seal through the opening into the interior of the housing;
   placing the seal in the gap; and
   filling the fluid into the seal and pressurizing the fluid with overpressure.

10. The method according to claim 9, wherein the housing has an opening through which the seal is insertable into the interior of the housing and placeable in the gap, wherein the arrangement comprises a transport covering for closing the opening, the method further comprising closing the opening with the transport covering after the infilling of the fluid.

11. The method according to claim 9, wherein the housing has an opening through which the seal is insertable into the interior of the housing and placeable in the gap, wherein the seal is first filled with the over-pressurized fluid and braced by the overpressure in the gap, the method comprising:

draining at least a part of the fluid from the seal; and removing the seal through the opening.

12. The method according to claim 11, wherein the arrangement comprises a transport covering for closing the opening, the method comprising:

initially closing the opening with the transport covering; and removing the transport covering before the draining of the at least one part of the fluid.

\* \* \* \* \*